US007846534B2

(12) United States Patent
Bouchard et al.

(10) Patent No.: US 7,846,534 B2
(45) Date of Patent: Dec. 7, 2010

(54) CLEANING CARDS WITH ANGLED CLEANING SURFACES

(75) Inventors: Stephen Anthony Bouchard, Auburn, ME (US); Peter Klein, North Yarmouth, ME (US); John Edward Condon, Sumner, ME (US); Glen Alan Bailey, Minot, ME (US)

(73) Assignee: Enefco International, Inc., Auburn, ME (US)

( * ) Notice: Subject to any disclaimer, the term of this patent is extended or adjusted under 35 U.S.C. 154(b) by 1229 days.

(21) Appl. No.: 11/194,852

(22) Filed: Aug. 1, 2005

(65) Prior Publication Data

US 2007/0026198 A1 Feb. 1, 2007

(51) Int. Cl.
*B32B 3/28* (2006.01)

(52) U.S. Cl. ...................... 428/179; 428/174; 15/210.1; 15/256.51

(58) Field of Classification Search ................. 428/174, 428/179, 181; 15/229.12, 210.1, 256.51; 399/327
See application file for complete search history.

(56) References Cited

U.S. PATENT DOCUMENTS 4,357,615 A 11/1982 Yoshiharu et al.
5,153,964 A 10/1992 Gelardi et al.
5,366,785 A * 11/1994 Sawdai ........................ 428/156
5,525,417 A 6/1996 Eyler
5,824,611 A 10/1998 Eyler
5,832,556 A 11/1998 Eyler
5,878,458 A 3/1999 Higginbotham
D420,658 S 2/2000 Eyler
6,087,279 A * 7/2000 Laun .......................... 442/402
6,107,221 A 8/2000 Nakajima et al.
6,156,407 A 12/2000 Neubauer et al.
6,210,490 B1 4/2001 Michael et al.
6,243,908 B1 6/2001 Battle et al.
6,353,233 B1 3/2002 Kikuchi et al.
6,611,985 B1 9/2003 Neubauer et al.

* cited by examiner

*Primary Examiner*—Alicia Chevalier
(74) *Attorney, Agent, or Firm*—Pepper Hamilton LLP

(57) ABSTRACT

A cleaning card for use in cleaning internal surfaces of machine components includes a substrate having a central plane between opposed surfaces thereof, a machine direction dimension defined between opposed end edges and a transverse direction dimension defined between opposed side edges. The substrate includes an embossment forming angled, substantially non-collapsible, elongate raised ridges on opposite sides of the cleaning card substrate, with the raised ridges being oriented at an angle to the machine direction for incrementally wiping transversely across the internal surfaces to be cleaned, which can include peripheral surfaces of idler rolls. Preferably the opposed surfaces of the substrate each have a plurality of discrete, raised and collapsible working areas for engaging and cleaning internal surfaces of machine components.

25 Claims, 4 Drawing Sheets

CLEANING CARDS WITH ANGLED CLEANING SURFACES

FIELD OF THE INVENTION

This invention relates generally to cleaning cards and more specifically to cleaning cards having the capability of cleaning a variety of internal surfaces of machine components, including peripheral surfaces of internal, rotatable idler rolls. In the most preferred applications the machine components are components of an actuating mechanism of the type intended to be actuated by an operating card or substrate, e.g., paper currency, that is read and/or scanned by the actuating mechanism. Representative actuating mechanisms in which the cleaning cards of this invention are most desirable utilized are actuating mechanisms for receiving paper currency, such as actuating mechanisms employed in vending and toll-receiving machines, although the cleaning cards of this invention can be utilized in a variety of different environments.

BACKGROUND ART

Many machines have reading mechanisms of the type intended to receive an operating card or other machine-operating substrate (e.g., paper currency) for actuating the operation of a machine, and/or for receiving a substrate including data to be scanned, such as a check. In many reading mechanisms internal surfaces are spaced apart a distance greater than the permissible thickness of the operating card or other operating substrate or a substrate to be scanned, to thereby keep the operating card and/or substrate out of contact with those internal surfaces, particularly internal surfaces of sensing and reading mechanisms, e.g., surfaces of magnetic sensors, optical lenses and other surfaces disposed in the internal cavity of the reading mechanism. Moreover, in many of these reading mechanisms, internal rails are provided to actually support the operating card or other substrate in a position out of contact with the sensing mechanisms. In addition, in many of these reading mechanisms, a feeding system including driven rolls and idler rolls is provided adjacent the entrance, for feeding the operating card and/or substrates into the reading mechanisms in a controlled manner. In some feeding systems employed in reading mechanisms, particularly reading mechanisms intended to receive paper currency for actuating the operation of a machine, a driven conveyor belt cooperates with idler rolls to provide a feed nip for engaging the machine-operating substrate (e.g., paper currency) and directing the substrate into the reading mechanism for actuating the operation of a machine (e.g., a vending machine, a toll-receiving machine, etc.).

Cleaning cards for use in attempting to clean the above-identified reading mechanisms are well known in the art, and are generally employed to traverse the same path in the reading mechanism that is traversed by the operating card and/or other operating substrate to be scanned. The most common commercially available cleaning cards are substantially flat substrates that are intended to closely approximate the dimensions of the machine-operating substrate so that they can be received in the reading mechanism for the purposes of cleaning internal surfaces thereof. However, if the maximum thickness of a cleaning card that can be accepted in a reading device of a machine is less than the spacing of the internal surfaces to be cleaned, then the cleaning card will not effectively engage those surfaces to provide its desired cleaning function. This is particularly troublesome in reading devices wherein the machine-operating substrate and cleaning card are inserted through a slot into an enclosed reading mechanism and actually are pulled into and retained within the enclosed mechanism during the operation and cleaning of the reading device, respectively. In these reading devices, the cleaning card cannot be manually pressed against either of the opposed internal surfaces within the slot, since the user of the card actually relinquishes control over its position when it is pulled into the enclosed mechanism.

Cleaning cards having raised surfaces for cleaning or removing foreign objects from internal machine surfaces are known in the prior art, as exemplified by the disclosures in U.S. Pat. No. 6,243,908 (Battle, et al.), U.S. Pat. No. 6,107, 221 (Nakajima, et al.) and U.S. Pat. No. 5,153,964 (Gelardi, et al.). A discussion of these latter three patents is included in co-pending application Ser. No. 10/857,382, which is assigned to the same assignee as the instant application, and is hereby fully incorporated herein by reference. Accordingly, the discussion of these latter three patents is not repeated herein, for purposes of brevity.

Application Ser. No. 10/857,382 discloses and claims an improved, very versatile solution to the problem of cleaning internal surfaces of machine components, such as machine-reading mechanisms, and in particular internal surfaces of sensing mechanisms that are spaced further apart from each other more than the maximum thickness of a substrate that can be received within the mechanism. Moreover, the cleaning card disclosed and claimed in the '382 application can be employed in virtually all environments in which conventional, prior art cleaning cards have been employed in the past, even in reading devices wherein the prior art cleaning cards actually are capable of engaging internal surfaces of a sensing mechanism to provide effective cleaning of those surfaces.

However, a potential problem was recognized in connection with attempting to clean reading mechanisms with the cleaning cards disclosed in the above-identified '382 pending application, when the path of travel of the machine-operating substrate in the reading mechanism is not in a single, substantially linear plane. For example, in certain scanning devices, such as check scanning devices, a check is directed into an inlet opening and then is conveyed through a curved, substantially U-shaped bend to an outlet opening. As the check is being conveyed through the curved path, it is read, or scanned by a reading mechanism. Also, in some reading mechanisms for receiving and identifying paper currency to actuate or operate a machine, e.g., a product dispensing machine, a toll-receiving machine, etc., the paper currency is directed into the reading mechanism in a first linear plane, and then the forward, or leading, end of the currency is caused to bend downwardly into a second plane to feed the currency into a collection bin.

It was discovered that the raised surfaces in the cleaning cards of the type described and claimed in co-pending application Ser. No. 10/857,382 tended to flatten out and, in some instances, not engage internal surfaces requiring cleaning when the cleaning cards either were caused to move through a curved, non-linear path, and/or when the forward, or leading, end of a cleaning card was bent to follow the same general path as the paper currency employed to operate a machine, as described above. In both of these latter systems, the movement of a cleaning card out of a single, substantially linear plane tends to apply a machine-direction tension to the card, resulting in at least a partial flattening of the raised cleaning surfaces in locations where they are required to be elevated to clean internal surfaces of the reading mechanism.

In co-pending application Ser. No. 10/957,830, titled Cleaning Cards and assigned to the same assignee as the instant application, a cleaning card is disclosed that employs novel relief means (e.g., slits, slots and/or cuts) in the cleaning card substrate for preventing the peaks of at least some of the discrete raised areas in the cleaning card from flattening toward the central plane to an extent that such peaks will not effectively engage and clean desired internal surfaces to be cleaned when the cleaning card moves in other than a single, substantially linearly plane in the machine-reading mechanism. The '830 application also discloses the provision of closely spaced embossments adjacent each end of a cleaning card to provide traction surfaces for reliable engagement by driven feed rolls of the mechanism intended to receive the cleaning card, and also to be employed to clean the driven feed rolls by manually constraining the cleaning card so that the driven feed rolls are permitted to rotate relative to and engagement with the small embossment adjacent either of the ends of the cleaning cards. The subject matter of co-pending application Ser. No. 10/957,830 is hereby fully incorporated herein by reference.

Some internal actuating mechanisms include a feed system including idler rolls cooperating with a driven belt adjacent the entrance for engaging an operating card or operating substrate and directing that card or substrate into the internal actuating mechanism to provide its desired machine-actuating function. Prior art cleaning cards have not been entirely effective in cleaning idler rolls in these feeding systems.

SUMMARY OF THE INVENTION

In accordance with this invention, cleaning cards for use in cleaning internal surfaces of machine components includes a substrate having a central plane between opposed surfaces thereof, a machine direction dimension defined between opposed end edges and a transverse direction dimension defined between opposed side edges. The substrate includes an angled embossment forming angled, substantially non-collapsible, elongate raised ridges in the opposed surfaces of the substrate, and these elongate raised ridges are oriented at an angle other than 90 degrees to the machine direction to incrementally wipe transversely across a surface to be cleaned while applying a wiping tension to said surface. While the angled ridges in the cleaning cards of this invention may be effective to engage and clean a variety of internal surfaces of machine components, the raised ridges are particularly well suited for incrementally engaging an idler roll surface along the axial extent of the idler roll as they pass through a nip including the idler roll, to apply tension to both aid in rotating and cleaning the idler roll.

In a preferred embodiment of this invention the opposed surfaces also include a plurality of discrete, raised and collapsible working areas for engaging and cleaning internal surfaces to be cleaned, including sensors and other internal components.

In the most preferred embodiment of this invention, at least some of the discrete raised and collapsible working areas are in longitudinal alignment with the raised ridges and are positioned relative to the raised ridges for wiping internal surfaces, e.g., outer surfaces of idler rolls, after the raised ridges have engaged those surfaces to loosen debris therefrom.

In the most preferred embodiments of this invention at least some of the discrete raised and collapsible working areas in the opposed surface provide an effective working thickness (hereinafter defined) which is greater than the effective thickness (hereinafter defined) between the non-collapsible raised ridges of the angled embossment on the opposed surfaces of the substrate.

In accordance with preferred embodiments of this invention, the cleaning card includes a plurality of pairs of raised ridges, with the ridges in each pair being in transverse alignment and with the plurality of pairs of raised ridges being aligned in the machine direction dimension of the card with adjacent pairs of raised ridges.

In accordance with this invention the angled ridges in each pair preferably are angled relative to each other in a substantially "V" orientation. In one embodiment of this invention respective raised ridges in each of the pairs of raised ridges are joined together in a substantially serpentine pattern, and in another, most preferred embodiment of this invention the respective ridges in at least some of the pairs of raised ridges are separated from each other in the machine direction.

In the embodiment of this invention in which the raised ridges on each side of the cleaning card substrate are arranged in a substantially serpentine pattern along the machine direction of the cleaning card, adjacent ridges in the substantially serpentine pattern are angled in opposite directions and are adapted to alternately incrementally engage a surface to be cleaned, e.g., an idler roll surface, in one direction along the transverse, or axial extent thereof and then in the opposite direction along the transverse, or axial extent thereof as the adjacent ridges pass, in seriatim, passed the surface to be cleaned, e.g., through a nip including the idler roll to both aid in rotating and cleaning the idler roll.

In the most preferred embodiment of this invention two pairs of adjacent raised ridges are joined to each other in a substantially diamond-shaped orientation that is located substantially medially between the opposed end edges and opposed side edges of the cleaning card substrate. The diamond-shaped orientation tends to rigidify the cleaning card in the center thereof and provides a planar central area that can be gripped by a vacuum pick-up head for transporting the card to a suitable packaging machine.

In accordance with preferred embodiments of this invention a plurality of raised and collapsible working areas are arranged in at least one row extending in the machine-direction dimension of the substrate adjacent one side edge thereof. More preferable a plurality of raised working areas are arranged in at least two rows extending in the machine-direction dimension of the substrate; each row being adjacent one side edge of the substrate. Most preferably raised working areas also are arranged in a row generally along the central longitudinal axis of the substrate; particularly when the cleaning card is required to clean sensors located medially in a currency reader for determining the authenticity of currency inserted into the reader for purposes of actuating the operation of a machine.

In one embodiment of this invention the elongate raised ridges on each side of the cleaning card substrate are arranged in two, transversely spaced-apart substantially serpentine patterns along the machine-direction dimension of the card, whereby adjacent ridges in each of the serpentine patterns are angled in opposite directions and are adapted to alternately incrementally wipe transversely, or axially, across a surface to be cleaned, e.g., an idler roll surface, in one direction along the transverse or axial extent of the surface and then in the opposite direction along the transverse or axial extent of the surface as the adjacent ridges in each of the substantially serpentine patterns pass over the surface to be cleaned, e.g., pass through a nip including a an idler roll to both rotate and clean the idler roll.

In a representative embodiment of this invention in which an idler roll surface is to be cleaned the effective machine-direction dimension of the ridges is less than the circumference of the idler roll to be rotated and cleaned by the ridges, whereby more than one of the ridges is required to engage the idler roll to rotate the idler roll through one complete revolution. In a representative embodiment, the effective machine-direction dimension of each of the angled ridges is less than 0.5 inches and the circumference of the idler is greater than one (1) inch.

In the most preferred embodiments of this invention there are at least five adjacent ridges in the machine direction for incrementally engaging surfaces, e.g., idler roll surfaces, during a cleaning operation. In a cleaning card employing a serpentine pattern there actually are ten such angled raised ridges joined to each other. In a second embodiment, wherein the angled ridges are disposed in pairs that are spaced apart from each other, and also include angled ridges joined to each other in the form of a diamond patterned in the center of the card, there are six angled ridges extending in the machine direction for engaging surfaces to be cleaned, such as idler roll surfaces.

Cleaning cards in accordance with certain preferred embodiments of this invention also can include relief means in the form of slits, slots and/or cuts extending through the substrate to prevent at least some of the discrete raised areas from excessively flattening toward the central plane of the card to an extent that the discrete raised areas will not effectively engage and clean desired internal surfaces to be cleaned when the cleaning card moves in other than a single, substantially linear plane in the machine-reading mechanism. Moreover, cleaning cards in accordance with this invention can include a series of small embossments adjacent one or both of the ends thereof to provide both traction aids for feed rolls associated with the mechanism to be cleaned, and also for use in cleaning the driven feed rolls by restraining movement of the cleaning cards in a position wherein the driven feed rolls rotate in engagement with and relative to the small embossments.

A preferred method of cleaning internal surfaces within a machine component, e.g., surfaces of rotatable idler rolls located within an internal section of the machine component, includes the steps of providing a cleaning card including a substrate having a central plane between opposed surfaces thereof, a machine-direction dimension defined between opposed end edges and a transverse-direction dimension defined between opposed side edges, said substrate including an angled embossment forming angled, substantially non-collapsible, elongate raised ridges on opposite surfaces of the cleaning card substrate, said raised ridges being oriented at an angle other than 90 degrees to the machine-direction dimension to incrementally wipe transversely or axially across a surface to be cleaned while applying a wiping tension to said surface and further including the step of inserting the cleaning card into a slot communicating with the internal section of the machine for causing the raised ridges to incrementally wipe transversely or axially across a surface to be cleaned. When the surface to be cleaned is the peripheral surface of an idler roll the step of inserting the cleaning card into the slot causes the raised ridges to incrementally wipe axially across the peripheral surface with tension to aid in both rotating and cleaning the peripheral surface thereof.

In the most preferred method of this invention the step of inserting the cleaning card into the slot is carried out by causing the cleaning card to move in and out of the slot more than one time.

In the most preferred embodiment of this invention the cleaning card also includes a plurality of discrete, raised and collapsible working areas, at least some of said working areas engaging and wiping debris from an internal surface to be cleaned, e.g., the peripheral surface of a rotatable idler roll, after the debris has been loosened by engagement with one or more of the raised ridges.

Most preferably, in addition to cleaning idler rolls within an internal section of a machine, a plurality of discrete, raised and collapsible working areas are employed to clean other internal surfaces, including sensors.

Reference throughout this application to "effective working thickness" means the thickness dimension between planes that are parallel to each other and are tangent to the highest points (e.g., peaks) of the raised and collapsible working areas disposed on opposite sides of the central plane.

Reference throughout this application to "effective thickness" in referring to the thickness between the non-collapsible raised ridges of the angled embossments on the opposed surfaces of the substrate means the thickness dimension between planes that are parallel to each other and are tangent to the highest points (e.g., peaks) of the non-collapsible raised ridges of the angled embossments on opposite sides of the central plane.

Reference throughout this application to "nominal thickness" means the thickness of the actual substrate normal to, and between the opposed surfaces of the substrate.

Reference throughout this application to "apex," "peak," "apices" or "peaks" refers to the highest location of discrete raised and collapsible working areas and the highest location of the non-collapsible raised ridges, which, unless specifically limited, can be a flat surface, the upper region of a curved surface, a linear edge, etc.

Reference to "upward" and "downward" or words of similar meaning in referring to the position or location of elements/surfaces of the cleaning cards of this invention is intended to refer to the relative position of the elements/surfaces rather than the absolute position or orientation of such surfaces. For example, raised ridges and working areas of the cleaning card that are upward facing in one orientation of the cleaning card become downwardly facing when the card is rotated 180° about its central longitudinal axis. Likewise, upon such rotation raised areas that previously were facing downward will become upwardly facing. Reference to such areas being "upward" and "downward" is intended to refer to the relative position of those areas on opposite sides of a central plane of the substrate of the cleaning card, as opposed to an absolute position relative to any machine surface or other reference surface, unless otherwise indicated by the context in which those terms are used.

BRIEF DESCRIPTION OF THE DRAWINGS

The invention will be described in conjunction with the following drawings in which like reference numerals designate like elements and wherein.

DESCRIPTION OF THE PREFERRED EMBODIMENTS OF THE INVENTION

Figures 1, 2, 3:
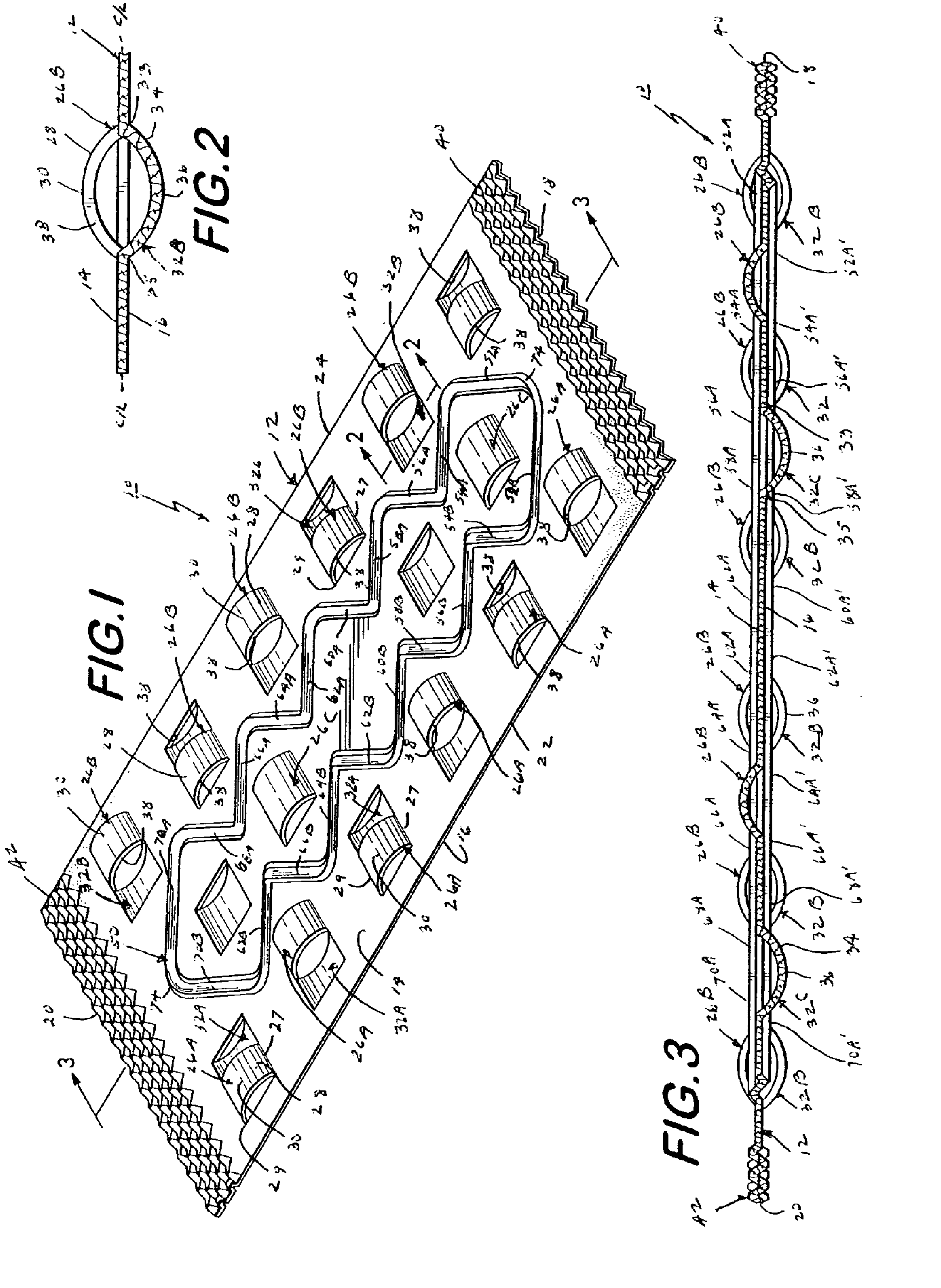
FIG. 1 is an isometric view of a cleaning card in accordance with this invention.
FIG. 2 is a sectional view along line 2-2 of FIG. 1.
FIG. 3 is a sectional view along line 3-3 of FIG. 1.

A cleaning card in accordance with one embodiment of this invention is illustrated at 10 in FIGS. 1-4. This cleaning card includes a substrate 12 having a central plane C/L (FIG. 2) between opposed surfaces 14 and 16. In addition, the substrate 12 has a machine-direction dimension disposed between opposed end edges 18 and 20 and a transverse-direction dimension disposed between opposed side edges 22 and 24.

The substrate 12 includes discrete raised areas 26A, 26B and 26C on one side of the central plane C/L, and these raised areas include a generally curved wall 28 joined at opposed ends 27, 29 to substantially planar sections of the substrate 12. The highest point of each of the curved walls 28 constitutes a peak 30 of the raised area.

In a similar fashion, a plurality of discrete raised areas 32A, 32B and 32C are disposed on the opposite side of the central plane C/L and are of the same general configuration as the discrete raised areas 26A, B and C. Specifically, each of the discrete raised areas 32A, B and C includes a generally curved wall 34 joined at its opposed ends 33, 35 to substantially planar sections of the substrate 12. Also, like the discrete raised areas 26A, B and C, the highest region of the generally curved wall 34 of each discrete raised area 32A, 32B and 32C constitutes a peak 36 of such raised area.

Figure 4:
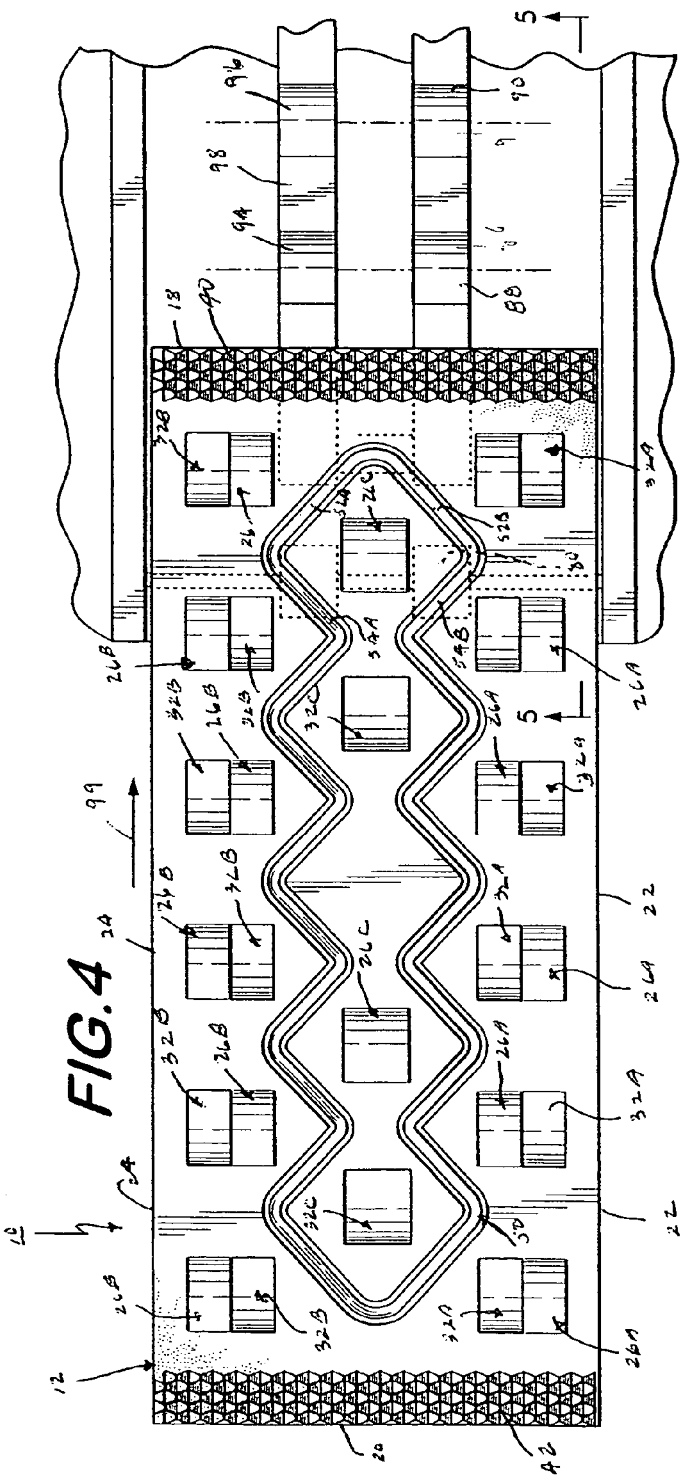
FIG. 4 is a schematic plan view showing the relative orientation of the cleaning card in connection with a feeding system employing rotatable driven rolls, and also rotatable idler rolls to be cleaned.

As can be seen best in FIGS. 1 and 4, the discrete raised areas 26A, B and C and 32A, B and C are, as a group, disposed in both the machine-direction dimension and the transverse-direction dimension of the substrate 12. The suffix "A" identifies discrete raised areas adjacent side edge 22 of the substrate 12, the suffix "B" identifies discrete raised areas adjacent side edge 24 of the substrate and the suffix "C" identifies discrete raised areas disposed generally along the longitudinal center line of the substrate. The discrete raised areas often are referred to herein solely by their suffix number, e.g., 26 and 32, when the discussion refers to all such raised areas, regardless of location relative to the side edges or longitudinal center line of the substrate 12.

As can be seen best in FIG. 1, adjacent discrete raised areas 26, 32 are separated from each other by slits or cuts 38, and similar slits or cuts 38 separate the discrete raised areas 26 and 32 from adjacent planar sections of the substrate 12. These slits or cuts 38 provide open areas for entrapping debris during the cleaning of machine components, such as a currency-receiving machine actuating mechanism employed in conjunction with various machines (e.g., vending machines, machines for receiving parking payments, etc.). Moreover, by providing the slits or cuts the discrete raised areas 26 and 32 can be formed outwardly of the central plane C/L a greater distance than would be possible if the slits or cuts were omitted. This permits the effective working thickness, as defined earlier herein, to be maximized, thereby ensuring that surfaces of the discrete raised areas 26 and 32 will engage desired internal surfaces of machine components that require cleaning, e.g., internal sensors, internal reading heads, etc. The manner in which discrete raised areas 26 and 32 can be formed and employed in the cleaning card 10 of this invention is described in detail in copending application Ser. No. 10/857,382, the subject matter of which already has been incorporated by reference herein.

As can be seen best in FIGS. 1 and 3, end regions 40 and 42 of the substrate 12 include closely spaced apart, small embossments. These closely spaced apart embossments are disposed in both the machine direction and transverse direction in each of the end regions 40 and 42 for providing a frictional gripping region on both of the opposed surfaces 14 and 16 of the substrate, which can be effectively gripped by driven feed rolls or rollers, to be described later, employed in the machine mechanism to be cleaned. These closely spaced apart embossments in the end regions 40, 42 are of a height substantially lower than the height of the compressible raised projections 26 and 32, and are spaced closely together to provide textured surfaces that can be easily and effectively gripped by the driven rollers of the machine mechanism to be cleaned. The exact configuration and pattern of the embossments can be varied widely within the scope of the invention. The important feature is that the embossments provide a sufficient textured surface to permit positive gripping by feed rolls of the machine-reading mechanism to be cleaned. Also, as will be described later, the embossments should provide a sufficiently textured surface to clean driven feed rolls of the machine mechanism in which the cleaning card 10 is employed. The structure and use of cleaning cards employing the closely spaced apart, small embossments is described in detail in copending application Ser. No. 10/957,830, the subject matter of which already has been incorporated herein by reference.

It should be understood that, in accordance with the broadest aspects of this invention, the end regions 40 and 42 of the substrate 12 can omit the closely spaced apart-small embossments. However, in the most preferred embodiments, such embossments are desired.

Referring to FIGS. 1, 3 and 4, a unique feature of the cleaning card 10 of this invention is the provision of an angled embossment, generally identified by the numeral 50. The angled embossment forms angled, substantially non-collapsible, elongate ridges 52A, 54A, 56A, 58A, 60A, 62A, 64A, 66A, 68A and 70A in one of the surfaces 14, and opposing angled, substantially non-collapsible elongate ridges 52A', 54A', 56A', 58A', 60A', 62A', 64A', 66A', 68A', and 70A' extending outwardly in opposed surface 16 (FIG. 3). The angled, substantially non-collapsible, elongate ridges 52A-70A and 52A'-70A' are arranged in respective serpentine patterns located between side edge 24 and the longitudinal central axis of the substrate 12.

Referring to FIG. 1, angled, substantially non-collapsible, elongate ridges 52B, 54B, 56B, 58B, 60B, 62B, 64B, 66B, 68B and 70B are on the surface 14 of the substrate 12, are substantially the same as the angled, substantially non-collapsible, elongate ridges 52A-70A and also are disposed in a serpentine pattern, but in a region between the side edge 22 and the central longitudinal axis of the substrate 12.

Similarly, angled, substantially non-collapsible, elongate ridges (partially illustrated in FIG. 1), extend outwardly in surface 16 in substantially underlying relationship to angled ridges 52B-70B. Thus, the ridges in surface 16 are in a serpentine pattern substantially identical to the angled, substantially non-collapsible, elongate ridges 52A' through 70A' illustrated in FIG. 3, but are disposed between the side edge 22 and the central longitudinal axis of the substrate 12.

It should be noted that curved ridge sections 74 join the distal ends of the serpentine arrangements of the angled raised ridges on surface 14 of substrate 12, and corresponding curved ridge sections underlie the curved ridge sections 74 and join the distal ends of the serpentine arrangement of the angled raised ridges forming the respective serpentine patterns in surface 16 of the substrate 12. This provides a symmetrical arrangement, making it clear to a user that either end of the cleaning card 10 can be inserted into the machine component to be cleaned.

Referring to the upwardly facing surface 14 illustrated in FIG. 1, it will be noted that the transversely aligned, angled non-collapsible ridges in each of the serpentine patterns in surface 14 of the substrate 12 are in a substantially "V-shaped" orientation relative to each other. For example, angled ridge section 52A and its transversely aligned angled ridge section 52B have a substantially V-shaped configuration. Similarly, angled ridge section 54A and transversely aligned ridge section 54B also have a generally V-shaped configuration, but in the opposite direction. This pattern of transversely aligned, angled, non-collapsible ridge sections is maintained throughout the entire machine-direction dimension of the cleaning card 10. Also, this same V-shaped configuration exists between the angled ridge sections 52A'-70A' and the transversely aligned angled ridge sections on the opposed surface 16 of the substrate 12.

The cleaning card 10 can be employed to clean internal surfaces of a variety of machine components. In these applications the angled, substantially non-collapsible ridge sections function to incrementally wipe transversely across a surface to be cleaned while applying a wiping tension to said surface. While the angled ridge sections of the cleaning cards of this invention may be effective to engage and clean a variety of internal surfaces of machine components, they are particularly well suited for incrementally engaging an idler roll surface along the axial extent of the idler roll as the raised ridges pass through a nip including the idler roll, to apply tension to both aid in rotating and cleaning the idler roll.

The manner in which the cleaning card 10 can be employed to clean internal surfaces of machine components, including internal, rotatable drive rolls and idler rolls, will now be described in connection with FIGS. 4 and 5, it being understood that the non-collapsible ridge sections may be employed to clean internal surfaces other than the peripheral surfaces of idler rolls. First, in a representative machine-actuating device intended to be actuated by paper currency, two pairs of transversely spaced apart driven feed rolls are provided. One of the pairs of driven rolls is indicated at 80, 82 in FIG. 5, and the top driven roll 80 is shown in dotted representation in the plan view of FIG. 4. It should be understood that the bottom driven roll 82 directly underlies roll 80. The other pair of driven feed rolls is transversely spaced from the pair of driven feed rolls 80, 82 and is schematically illustrated in dotted representation underlying the cleaning card in FIG. 4. These rolls are positively driven to feed paper currency into the actuating mechanism for the purpose of operating a machine. In a like manner, these rolls are capable of gripping the cleaning card 10 to assist in directing the cleaning card into the internal region of the machine-actuating mechanism to clean desired surfaces therein. In the preferred embodiment of this invention the pattern of closely spaced apart small embossments in each end region 40, 42 of the substrate 12 provides traction surfaces that easily can be gripped by the two pairs of driven feed rolls, thereby permitting either end edge 18, 20 of the cleaning card 10 to be inserted first into the mechanism to be cleaned. In a like manner, since the traction embossments are included on both opposed surfaces 14, 16 of the substrate 12, the cleaning card 10 can be inserted into the mechanism to be cleaned with either of the opposed surfaces 14, 16 disposed in an upward direction. Regardless which of the opposed surfaces 14, 16 is facing upwardly, there will be raised working areas 26 on one side and raised working areas 32 on the opposed side. In addition, as explained earlier, angled, substantially non-collapsible elongate ridges also are provided in each surface 14, 16, thereby making the cleaning card 10 usable in all orientations.

It also should be noted that in the preferred embodiment of this invention employing the closely spaced embossments in the end regions 40, 42 of the cleaning card 10, either end region 40, 42 including those embossments can be inserted into engagement with the rotating feed rolls, and, with the embossments maintained within the nip between the pairs of feed rolls by providing a retarding force on the cleaning card to prevent its linear movement into the machine-actuating mechanism, the driven rollers will rotate relative to, and in engagement with the spaced-apart embossments to clean the rollers. This cleaning mechanism is described in detail in copending application Ser. No. 10/957,830, the subject matter of which already has been incorporated by reference herein.

Figure 5:
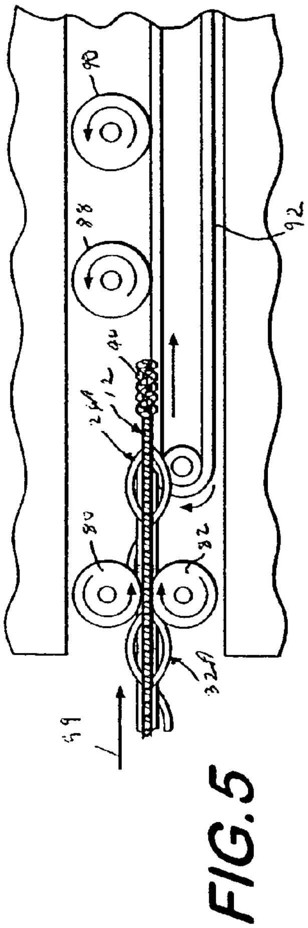
FIG. 5 is a sectional view along line 5-5 of FIG. 4.

Still referring to FIGS. 4 and 5, a pair of idler rolls 88, 90 is spaced apart in the machine direction of the cleaning mechanism and overlies and is in close proximity to a driven, lower drive belt 92.

A second pair of idler rolls 94, 96 (FIG. 4) are transversely aligned with the idler roll 88, 90, respectively, and overlie a second driven belt 98 in close proximity to and preferably in engagement with said belt.

As the cleaning card 10 is directed through the nips provided by the longitudinally spaced apart idler rolls 88, 90 and their cooperating conveyor belt 92, and the longitudinally spaced apart idler rolls 94, 96 and their cooperating conveyor belt 98, the angled, substantially non-collapsible elongate ridges extending upwardly will engage each of the idler rolls incrementally from one axially end of each idler roll to its opposed axially end, and then, in seriatim, from the opposed axial end to said one axial end. This pattern of incrementally scraping across the axial dimension of the idler rolls is repeated as each of the angled, substantially non-collapsible elongate ridges moves through the nips provided by the idler rolls to be cleaned and their respective driven belts.

To further explain, assuming that the cleaning card 10 is directed into the mechanism to be cleaned with the surface 14 facing upwardly, and that the cleaning card is being directed into the mechanism to be cleaned in the direction of arrow 99, angled non-collapsible, elongate ridges 52A, 52B initially will engage transversely aligned idler rolls, 94, 88, respectively, and thereafter transversely spaced apart idler rolls 96, 90, respectively, located downstream from the idler roll 94, 88, respectively.

The initial point of contact of the raised ridges 52A, 52B with the idler roll 94, 88 will be adjacent the axial ends of those rolls closest to the central longitudinal axis. Thereafter, as the cleaning card 10 continues to move through the nip provided by the transversely spaced apart idler rolls 94, 88 and their respective, underlying driven belts 98, 92 the raised ridges, 52A, 52B, by virtue of being angled outwardly, will incrementally move along those idler rolls to a point where it wipes, or scrapes the entire axially extent of said idler rolls.

It should be noted that in order for the angled, substantially non-collapsible elongate ridges to scrape the entire axially extent of the idler rolls the effective transverse dimension of each of the angled ridges 52A, 52B, etc., needs to be greater than the axial dimension of each of the idler rolls. In one preferred embodiment, the effective transverse dimension of the angled ridges is approximately one half (½) inch and each of the idler rolls has an axial dimension in the range of $\frac{3}{16}$ of an inch to ¼ of an inch.

As the cleaning card 10 continues to move into the mechanism to be cleaned, the inwardly inclined angled ridges 54A, 54B will engage the transversely spaced apart idler roll 94, 88 respectively. However, in this case the initial engagement of the ridges with the idler rolls is adjacent the outer axial end of the idler rolls, farthest from the longitudinal center line of the mechanism to be cleaned, and then will incrementally scrape the surfaces of the idler rolls in a direction toward the central axis of the mechanism to be cleaned.

The above arrangement of incrementally scraping the idler rolls in opposite directions is repeated as the remaining elongate ridges 56A, 56B; 58A, 58B; 60A, 60B; 62A, 62B; 64A, 64B; 66A, 66B; 68A, 68B and 70A, 70B traverse or pass the idler rolls 94, 88. This incremental scraping action also aids in driving the idler rolls so that the idler rolls are rotated as they are being scraped. The multiple passes of angled elongate ridges past the idler rolls ensure that effective scraping of the surfaces of the idler rolls takes place.

Although the cleaning card 10 is acceptable for many applications, applicants discovered that in some applications simply scraping the surface of the idler rolls with the elongate ridges was not adequate to effectively remove foreign debris, such as ink, from the idler rolls. Essentially, applicants determined that in the most preferred arrangement the cleaning card should be capable of wiping the surfaces of the idler rolls after those surfaces have been scraped or chiseled by the elongate, angled non-collapsible ridges. The recognition of this desired feature led to the discovery of the most preferred embodiment of this invention, as represented by the cleaning card designated at 100 in FIGS. 6-9.

The cleaning card 100 has many features that are similar to the cleaning card 10. The principal difference between the cleaning card 100 and the cleaning card 10 is in the general configuration of the angled, raised ridges that incrementally wipe transversely across a surface to be cleaned while applying a wiping tension to said surface and the location of some raised working areas relative to the angled ridges to aid in wiping the surface after the surface has been scraped by the angled ridges. Details of these differences will be described hereinafter.

While the angled, raised ridges of the cleaning card 100, like the angled, raised ridges of the cleaning card 10, may be effective to engage and clean a variety of internal surfaces of machine components, these angled raised ridges are particularly well suited for incrementally engaging an idler roll surface along the axial extent of the idler roll as the raised ridges pass through a nip including the idler roll, to apply tension to both aid in rotating and cleaning, or scraping, the idler roll. The discussion that follows with respect to the cleaning card 100 will be directed to the most preferred application in which the non-collapsible raised ridges are employed to rotate and scrape the peripheral surface of one or more idler rolls.

Figures 6, 7:
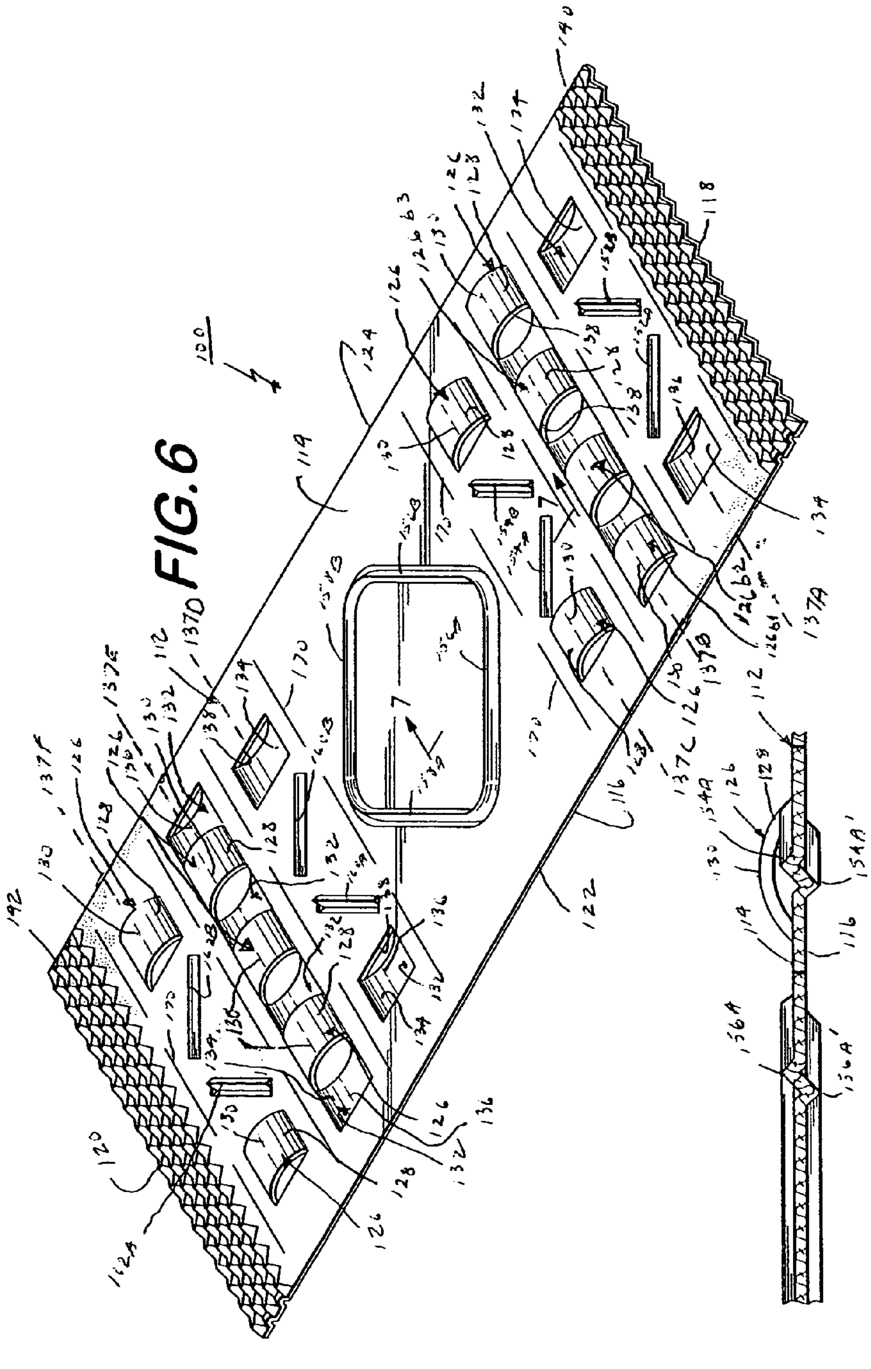
FIG. 6 is an isometric view of a second and more preferred embodiment of a cleaning card in accordance with this invention.
FIG. 7 is a sectional view along line 7-7 of FIG. 6.

Referring specifically to FIGS. 6 and 7, the cleaning card 100 includes a substrate 112 having opposed surfaces, 114, 116, opposed end edges 118, 120 and opposed side edges 122, 124. The substrate 112 can be of the same composition as the substrate 12, as will be discussed in greater detail hereinafter.

The substrate 112 also includes discrete raised working areas 126 in one of the surfaces 114, and these working areas include generally curved walls 128, with the highest point of the curved walls constituting peaks 130. Similarly, discrete raised areas 132 are disposed in the opposed surface 116 of the substrate 112, and these discrete raised areas include generally curved walls 134, with the highest point thereof constituting peaks 136.

The general configuration of the discrete raised areas 126 and 132 are the same as the discrete raised areas 26 and 32 in the cleaning card 10, but are oriented differently than the raised working areas in the cleaning card 10. In particular, the raised working areas 126, 132 are disposed in 6 transverse rows, designated 137A, 137B, 137C, 137D, 137E, and 137F, respectively (FIGS. 6 and 8).

It should be noted that slits or cuts 138 separate adjacent discrete raised areas 126, 132 from each other, and also separate the discrete raised areas from adjacent flat sections of the substrate 112. These slits or cuts 138 provide open areas for entrapping debris during the cleaning of machine components, such as a currency-receiving machine-actuating mechanism employed in conjunction with various machines (e.g., vending machines, machines for receiving parking payments, etc.). Moreover, by providing the slits or cuts, the discrete raised areas 126 and 132 can be formed outwardly of the central plane a greater distance than would be possible if the slits or cuts were omitted. This permits the effective working thickness, as defined earlier herein, to be maximized, thereby ensuring that surfaces of the discrete raised areas 126, 132, will engage desired internal surfaces of machine components that require cleaning, e.g., internal sensors, internal reading heads, etc. In summary, the slits or cuts 138 in the cleaning card 100 provides the same function as the slits or cuts 38 in the cleaning card 10.

Figure 8:
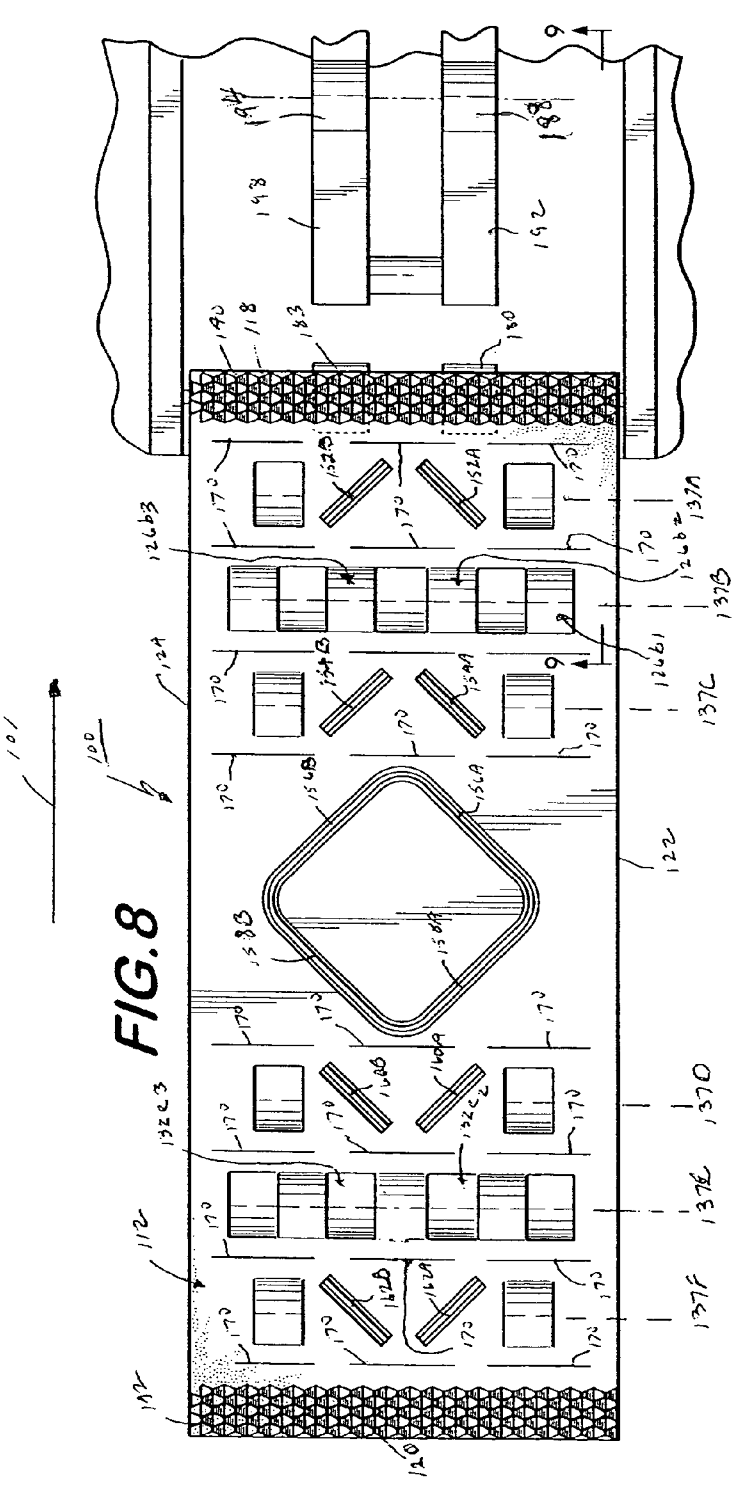
FIG. 8 is a schematic plan view showing the relative orientation of the cleaning card shown in FIG. 6, in connection with a feeding system employing rotatable driven rolls, and also rotatable idler rolls to be cleaned.
Figure 9:
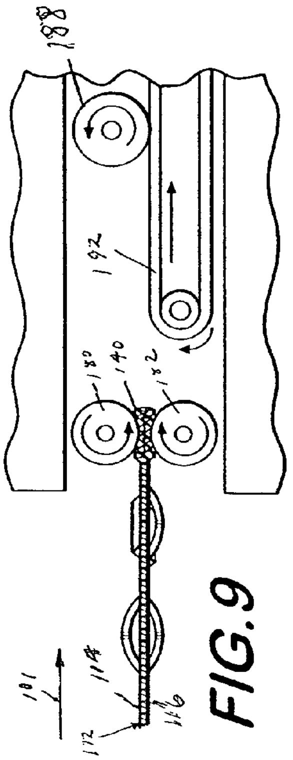
FIG. 9 is a sectional view along line 9-9 of FIG. 8.

Referring specifically to FIGS. 6, 8 and 9, it should be noted that the substrate 112 includes end regions 140, 142 that, in the preferred embodiment, include closely spaced apart embossments that can be identical to the embossments provided in the cleaning card 10. The functions provided by the closely spaced apart embossments in cleaning card 100 are the same as those described in connection with the closely spaced apart embossments of the cleaning card 10, and therefore, for purposes of brevity, will not be repeated herein. Suffice it to state that the closely spaced apart embossments can be omitted from the cleaning card 100 in accordance with the broadest aspects of this invention, but do provide very desirable functions in accordance with the most preferred embodiments of this invention.

As noted earlier, the most significant difference between the cleaning card 100 and the cleaning card 10 is the manner in which the angled embossments are formed, and the manner in which raised working areas are oriented relative to the embossments.

Referring to FIGS. 6 and 8, the angled embossment includes angled, substantially non-collapsible, elongate ridges 152A, 154A, 156A, 158A, 160A and 162A in one of the opposed surfaces 114, and underlying, angled, substantially non-collapsible elongate ridges extending outwardly in the opposed surface 116, two of which are illustrated as 154A' and 156A' in FIG. 7. It should be noted that non-collapsible ridges similar to 154A' and 156A' extend outwardly in surface 116 and underlie ridges 152A, 158A, 160A and 162A. These angled, substantially non-collapsible elongate ridges 152A-162A and the underlying ridges extending outwardly in opposed surface 116 (e.g., 154A', 156A') are also aligned in the machine-direction dimension of the cleaning card 100, and are located between side edge 122 and the longitudinal central axis of the substrate 112.

Still referring to FIGS. 6 and 8, the angled embossment also includes angled, substantially non-collapsible elongate ridges 152B, 154B, 156B, 158B, 160B and 162B which are substantially the same as the angled, substantially non-collapsible elongate ridges 152A-162A, but are disposed in a region between the side edge 124 and the central longitudinal axis of the substrate 112.

Similarly, angled, substantially non-collapsible elongate ridges substantially underlie ridges 152B through 162B and are substantially identical to the angled, substantially non-collapsible elongate ridges that underlie ridges 152A through 162A. It should be noted that the angled ridges that essentially underlie corresponding angled ridges 152B-162B like the angled ridges 152B-162B, are disposed in a region between side edge 124 and the longitudinal central axis of the substrate 112.

In the preferred embodiment, the non-collapsible, elongate ridges 152A, 152B are transversely aligned, and are angled to provide a V-shaped configuration. This same V-shaped configuration exists between transversely aligned elongate ridges 154A, 154B; 160A, 160B and 162A, 162B. It also should be noted that the transversely aligned angled ridges 156A, 156B and 158A, 158B are integrally joined in the central region of the cleaning card substrate 112 in a substantially diamond-shaped configuration. This diamond shaped arrangement maintains a desired stiffness to permit a vacuum pick tip unit to engage the center of the diamond and convey the card to a desired packaging machine.

Referring specifically to FIGS. 6 and 8, the cleaning card 100 in accordance with the most preferred embodiment of this invention includes relief areas 170 in the substrate 112 for preventing the peaks 130, 136 of at least some of the discrete raised areas 126, 132 from flattening toward the central plane to an extent that such peaks will not effectively engage and clean desired internal surfaces of a machine component when the cleaning card is subjected to machine-direction tension resulting from movement of the card in other than a single, substantially linear plane or path in the machine mechanism to be cleaned.

The relief areas 170 preferably are in the form of slits, slots and/or cuts through the substrate 112, which dissipate the machine-direction tension without excessive flattening or collapsing of the peaks 130, 136 that are required to remain in a substantially uncollapsed state to provide a desired cleaning function. In the illustrated embodiment, the relief areas 170 are discrete slits or cuts extending through the substrate 112 in substantially planar segments of the card and are spaced apart in eight (8) transverse rows. In particular, a series of slits form a transverse row between transverse rows of raised working areas, i.e., traverse rows 137A, 137B; 137B, 137C; 137D, 137E and 137E, 137F. In addition, a transverse row of slits is provided between the transverse row of working areas 137A and end region 140, and between the transverse row of working areas 137F and the end region 142. Two additional transverse rows of relief areas 170 are provided on opposed sides of the diamond-shaped pattern of raised ridges located in the center of the substrate 112.

It should be understood that the required or desired location of the relief areas 170 will be dictated by the location of discrete raised areas 126 and/or 132 that need to be maintained in a raised condition to provide a desired cleaning function and also by the path of travel required of the cleaning card.

For example, when cleaning a sensor(s) located in a slot adapted to receive and sense paper currency, where the sensor(s) is (are) located upstream of a location in the slot where the cleaning card is required to change direction (e.g., move from a horizontal path into a downward path) the relief slots may need to be employed only in forward, or leading, sections of the card that first encounter the change in direction. Including the release slots in this latter location may dissipate the machine-direction tension or stress imposed upon the card as it changes direction, thereby preventing this stress or tension from acting upon, and flattening upstream raised areas 126 and/or 132 in the region(s) where they are required to remain substantially uncollapsed to clean the sensor(s).

Where the slot of the mechanism to be cleaned is substantially U-shaped, such as the slot in check readers where a check is inserted into one leg of the U-shaped slot, moves about a curved arc at the bottom of the slot, which may include a sensor or other surface requiring cleaning, and is then directed back to the user through the other leg of the U-shaped slot, it may be necessary or desirable to prevent collapse of the raised areas in all transverse rows. Thus, it may be necessary or desirable to include the relief areas in the form of transversely spaced apart slots, cuts, or slits in substantially all planar regions between raised collapsible working areas, such as is illustrated in FIG. 6.

It should be understood that although the release slits 170 are desirable in the most preferred embodiments of this invention, in accordance with the broadest aspects of this invention they need not be employed. In particular, the broadest aspects of this invention relate to the provision of the angled, non-collapsible ridges in the structure, as previously described.

An additional advantageous feature of this invention resides in including at least one raised and collapsible working area 126, 132, in machine-direction alignment with elongate, raised, non-collapsible ridges, whereby, after those ridges scrape the surface of idler rolls to loosen debris therefrom, that debris is removed by a wiping action provided by one or more longitudinally aligned, collapsible working areas 126, 132.

To identify specific raised working areas in the cleaning card 110 a letter suffix is employed to identify the row in which that working area exists, and a number suffix following the letter suffix is employed to identify the location of the raised area relative to the side edge 122. Thus, for example, referring to FIGS. 6 and 8, discrete collapsible working area **126*b*1 identifies the raised working area 126 closest to the side edge 122 and located in row 137B. In accordance with the illustrated embodiment, raised working areas 126*b*2 and 126*b*3 are essentially in machine-direction alignment with angled, substantially non-collapsible elongate raised ridges 152A through 162A and 152B through 162B, respectively. Similarly, discrete raised collapsible working areas 132*e*2 and 132*e*3, located in row 137E, are in machine-direction alignment with the angled, substantially non-collapsible elongate ridges that underlie the ridges 152A through 162A and 152B through 162**B, respectively.

The manner in which the cleaning card 100 can be employed to clean internal surfaces of machine components, including internal, rotatable drive rolls and idler rolls, will now be described in connection with FIGS. 8 and 9. It should be understood that the machine-actuating device illustrated in FIGS. 8 and 9 is identical to the machine-actuating device illustrated in FIGS. 4 and 5. In particular, the representative machine-actuating device intended to be actuated by paper currency includes two pairs of transversely spaced apart driven feed rolls. One of the pairs of driven rolls is indicated at 180, 182 in FIG. 9, and the top driven feed roll 180 is shown in the plan view of FIG. 8. It should be understood that the bottom driven roll 182 directly underlies the roll 180, and therefore is not visible in the plan view in FIG. 8. The other pair of driven feed rolls is transversely spaced from the pair of driven feed rolls 180, 182, and only the top roll of this latter pair is illustrated at 183 in FIG. 8. It should be understood that the other roll of this pair directly underlies the driven feed roll 183 and therefore is not visible in FIG. 8.

The driven feed rolls are positively driven to feed paper currency into the actuating mechanism for the purpose of operating a machine. In a like manner, these rolls are capable of gripping the cleaning card 100 and assisting in directing the cleaning card into the internal region of the machine-actuating mechanism to clean desired surfaces therein. In the preferred embodiment of this invention, the pattern of closely spaced apart small embossments in each region 140, 142 of the substrate 112 provides traction surfaces that easily can be gripped by the two pairs of driven feed rolls, thereby permitting either end edge 118, 120 of the cleaning card 100 to be inserted first into the mechanism to be cleaned. In a like manner, since the traction embossments are included on both surfaces 114, 116 of the substrate 112, the cleaning card 100 can be inserted into the mechanism to be cleaned with either of the opposed surfaces 114, 116 disposed in an upward direction. Regardless which of the opposed surfaces 114, 116 is facing upwardly, there will be raised working areas 126 on one side and raised working areas 132 on the opposed side. In addition, as explained earlier, angled, substantially non-collapsible elongate ridges also are provided on each surface 114, 116, thereby making the cleaning card 100 usable in all orientations.

It also should be noted that in the preferred embodiment of this invention employing the closely spaced embossments in the end region 140, 142 of cleaning card 100, an end region including those embossments can be inserted into engagement with the rotating feed rolls, and, with the embossments maintained within the nip between the pairs of feed rolls by providing a retarding force on the cleaning card to prevent its linear movement into the machine-actuating mechanism, the driven rollers will rotate relative to, and in engagement with the closely spaced-apart embossments for cleaning the rollers. This cleaning process is described in detail in copending application Ser. No. 10/957,830, the subject matter of which already has been incorporated by reference herein.

Still referring to FIGS. 8 and 9, a pair of idler rolls includes rolls that are spaced apart in the machine direction of the cleaning mechanism and overlie and are in close proximity to a driven, lower drive belt 192. In FIG. 5 only one of the idlers rolls 188 is illustrated, it being understood that the other idler roll is spaced downstream from the idler roll 188, and is in the same location as idler roll 90 depicted in FIG. 5.

A second pair of idler rolls includes rolls that are transversely aligned with the rolls of the first pair of idler rolls described above, and overlie a second driven belt 198 in close proximity to and preferably in engagement with the belt 198. Only one of the idler rolls in the second pair is shown at 194 in FIG. 8. The second idler roll of the second pair is downstream of the idler roll 194 and is identical to the idler roll 96 illustrated in FIG. 4.

As the cleaning card 100 is directed through the nips provided by the longitudinally spaced apart idler rolls (one being shown at 188) and their cooperating conveyor belt 192, and the longitudinally spaced apart idler rolls (one being shown at 194) and their cooperating conveyor belt 198, the angled, substantially non-collapsible elongate ridges extending upwardly to engage the idler rolls will engage each of the idler rolls incrementally from one axial end to its opposed axial end.

To further explain, assuming the cleaning card 100 is directed into the mechanism to be cleaned with the surface 114 facing upwardly and in the direction of arrow 101, angled, non-collapsible elongate ridges 152A, 152B initially will engage transversely aligned idler rolls 188, 194 and thereafter transversely spaced apart idler rolls (not shown) located downstream from the idler rolls 88, 94, respectively.

The initial point of contact of the raised ridges 152A, 152B with the idler roll 188, 194 will be adjacent the axial ends of those rolls closest to the central longitudinal axis. Thereafter, as the cleaning card 100 continues to move through the nip provided by the transversely spaced apart idler rolls 188, 194 and their respective, underlying driven belts 192, 198, the raised ridges 152A, 152B, by virtue of being angled outwardly, will incrementally move along those idler rolls to a point where it wipes, or scrapes, the entire axial extent of said idler rolls.

It should be noted that in order for the angled, substantially non-collapsible elongate ridges to scrape the entire axial extent of the idler rolls, the effective transverse dimension of each of the angled ridges 152A, 152B, etc., needs to be greater than the axial dimension of each of the idler rolls. In one preferred embodiment, the effective transverse dimension of the angled ridges is approximately one-half (½) inch or greater, and each of the idler rolls has an axial dimension in the range $\frac{3}{16}$ of an inch to ¼ of an inch. As the cleaning card 100 continues to move into the mechanism to be cleaned, the idler rolls that have been scraped by the angled ridges 152A, 152B, to thereby loosen the debris therefrom, are engaged by collapsible upwardly directed working areas **126*b*2 and 126*b*3**, which function to engage and wipe the scraped debris off of the idler rolls.

Thereafter, additional scraping action takes place by engagement of the idler rolls with angled ridges 154A, 154B, which act to scrape the idler rolls in the same manner as angled ridges 152A, 152B. Continued movement of the cleaning card 100 causes the upwardly extending angled raised ridges 156A, 156B to also scrape the surface of the idler rolls, and this scraping action takes place in the same direction along the axial extent of the idler rolls, as the scraping action provided by angled ridges 152A, 152B and 154A, 154B.

As the cleaning card continues to move into the mechanism to be cleaned, the idler rolls will be engaged, in seriatim, by inclined angled ridges 158A, 158B; 160A, 160B and 162A, 162B. However, in connection with these latter ridges, the initial engagement of the ridges with the idler rolls is adjacent the outer axial end of the idler rolls, farthest from the longitudinal center line of the mechanism to be cleaned, and then the ridges incrementally scrape the surface of the idler rolls in a direction toward the central axis of the mechanism to be cleaned.

The cleaning card 100 is acceptable for use in cleaning various different mechanisms. However, one of the most preferred applications for the cleaning card depicted in the present invention is for cleaning fairly sophisticated, currency-actuating machines that have a cleaning mode separate from the actuating mode. In particular, the mechanisms that most desirably employ the cleaning cards of this invention have a compartment for receiving the currency inserted into the machine, and also include several other compartments that retain either paper currency or coins to be used in making change for a consumer.

In the cleaning mode, the machine is designed to reciprocate the cleaning card in and out of the entrance slot several times during a cleaning cycle, whereby the idler rolls and other surfaces to be cleaned will be contacted several times by angled raised ridges and/or compressible working areas, as the case maybe. For example, the cleaning card may be reciprocated in and out three or four times, before then being directed into the region of other currency-holding compartments to clean internal surfaces thereof. In this construction, and with the cleaning card 100 disposed with surface 14 facing upwardly, the upwardly extending collapsible working areas **126*a*2 and 126*a*3 are the working areas that are responsible for wiping the idler rolls to remove debris that has been loosened by angled, non-collapsible ridges that are aligned in the machine direction with such collapsible working areas. The reciprocating action imposed upon the cleaning card 100 permits several passes of the angled non-collapsible ridges and the upwardly extending working areas 126*a*2 and 126*a*3** in engagement with the surfaces of the idler rolls, thereby providing a very effective cleaning action.

The cleaning cards of this invention can be formed of any of the well known conventional materials employed for such cleaning cards, the specific components of the cleaning card not constituting a limitation on the broadest aspects of this invention. A representative, non-limiting example of a cleaning card 10/100 in accordance with this invention includes a substrate 12 having an extruded, central film layer and a spunbond polyester layer applied to both sides of the central film layer while the central layer is still hot. The central film layer can be any desired plastic material, e.g., high-density polyethylene, polystyrene, polypropylene, etc. As noted above, the particular materials making up the components of the substrate 12, 112 do not constitute a limitation on the broadest aspects of this invention.

A representative cleaning card has a length of approximately 6.25 inches, a transverse dimension of approximately 2.56 inches, a nominal thickness of approximately 0.012 inches and an effective working thickness in the range of about 0.12 mils to 0-14 mils. The effective thickness of the non-collapsible raised ridges is approximately 0.06 inches. Thus, in on preferred structure the effective working area thickness is approximately twice the effective thickness between the non-collapsible ridges, and the effective thickness of the non-collapsible ridges is approximately 5 times the nominal thickness of the substrate 12, 112.

It should be emphasized that the dimensions identified above are representative examples to provide to those skilled in the art a general idea of the construction of a representative cleaning card in accordance with this invention. This example is by no means considered to be a limitation on the broadest aspects of the invention; the broadest aspects being defined in the appended claims, as construed in accordance with accepted principles of claim construction.

What we claim as our invention is the following:

1. A cleaning card for the use in cleaning internal surfaces of machine components, said cleaning card including a substrate having a central plane between opposed surfaces thereof, a machine direction dimension defined between opposed end edges and a transverse direction dimension defined between opposed side edges, said substrate including an angled embossment forming angled, elongate raised ridges in said opposed surfaces of said cleaning card substrate and being continuously joined to said substrate, said raised ridges being elongate at an angle other than 90 degrees to both the machine direction and transverse direction to incrementally wipe transversely across said internal surfaces to be cleaned, said opposed surfaces of said substrate each including a plurality of discrete, raised working areas having an apparent working thickness for engaging and cleaning internal surfaces to be cleaned, said plurality of raised working areas being joined to said substrate at opposed ends that are spaced-apart locations, said discrete raised working areas each including a peak intermediate said opposed ends, and a sloping peripheral wall, said peripheral wall having sloping sections in opposite directions from opposed sides of said peak to said opposed ends of the working areas, said peak of each raised working area being further from the central plan of the substrate than the opposed ends that are spaced-apart in the machine direction, said elongate raised ridges of the angled embossment having an apparent thickness less than the apparent working thickness of the raised working areas, said raised working areas being more easily collapsible than said elongate raised ridges.

2. The cleaning card of claim 1, wherein said opposed surfaces each include a plurality of discrete, raised and collapsible working areas for engaging and cleaning internal surfaces to be cleaned.

3. The cleaning card of claim 1, said elongate raised ridges being oriented an angle other than 90 degrees from the machine direction for incrementally engaging an idler roll surface along the axial extent thereof as the raised ridges pass through a nip including said idler roll to both aid in rotating and cleaning said idler roll.

4. The cleaning card of claim 3, wherein at least some of said discrete raised working areas are in longitudinal alignment with said raised ridges and positioned relative to said raised ridges for wiping surfaces of said idler rolls after said raised ridges engage said surfaces for loosening debris from said surfaces.

5. The cleaning card of claim 3, wherein at least some of said discrete raised working areas are in longitudinal alignment with said raised ridges and positioned relative to said raised ridges for wiping surfaces of said idler rolls after said raised ridges engage said surfaces for loosening ink build-up on said surfaces resulting from said surfaces engaging paper currency in a machine reading device.

6. The cleaning card of claim 3, wherein raised ridges are aligned in the machine direction dimension of the card.

7. The cleaning card of claim 3, wherein a plurality of raised working areas are arranged in at least one row extending in the machine-direction of the substrate adjacent one side edge thereof.

8. The cleaning card of claim 3, wherein a plurality of raised working areas are arranged in at least two rows, one of said rows extending in the machine-direction of the substrate adjacent one side edge of the substrate and the other row also extending in the machine-direction of the substrate.

9. The cleaning card of claim 3, wherein a plurality of raised working areas are arranged in at least three rows, said at least three rows extending in the machine-direction of the substrate, one of said rows being adjacent one side edge of the substrate, a second row being adjacent the opposed side edge of the substrate and a third row being substantially along the central longitudinal axis of the substrate.

10. The cleaning card of claim 3, wherein elongate raised ridges on each side of said cleaning card substrate are arranged in a substantially serpentine pattern along the machine direction dimension of said cleaning card, whereby adjacent ridges in said substantially serpentine pattern are angled in opposite directions and are adapted to alternately incrementally engage an idler roll surface of an idler roll in one direction along the axial extent of said idler roll and then in the opposite direction along the axial extent of the idler roll as said adjacent ridges pass through a nip including said idler roll.

11. The cleaning card of claim 10, wherein elongate raised ridges on each side of said cleaning card substrate are arranged in two, transversely spaced-apart substantially serpentine patterns along the machine direction dimension of said cleaning card, whereby adjacent ridges in each of said substantially serpentine patterns are angled in opposite direction and are adapted to alternately incrementally engage an idler roll surface of an idler roll in one direction along the axial extent of said idler roll and then in the opposite direction along the axial extent of the idler roll as said adjacent ridges in each of said substantially serpentine patterns pass through a nip including a respective idler roll to both rotate and clean said idler rolls.

12. The cleaning card of claim 3, including a plurality of pairs of raised ridges, the ridges in each pair being in transverse alignment, said plurality of pairs of raised ridges being aligned in the machine direction dimension of the card with adjacent pairs of raised ridges.

13. The cleaning card of claim 12, wherein at least some of said discrete raised working areas are in longitudinal alignment with said raised ridges and positioned relative to said raised ridges for wiping surfaces of said idler rolls after said raised ridges engage said surfaces for loosening debris from said surfaces.

14. The cleaning card of claim 12, wherein said plurality of pairs of raised ridges are joined to each other in a substantially serpentine pattern.

15. The cleaning card of claim 12 wherein the ridges in each pair being angled relative to each other in a substantially "V" orientation.

16. The cleaning card of claim 12, wherein a plurality of raised working areas are arranged in at least one row extending in the machine-direction dimension of the substrate adjacent one side edge thereof.

17. The cleaning card of claim 12, wherein a plurality of raised working areas are arranged in at least three rows, said at least three rows extending in the machine-direction of the substrate, one of said rows being adjacent one side edge of the substrate, a second row being adjacent the opposed side edge of the substrate and a third row being substantially along the central longitudinal axis of the substrate.

18. The cleaning card of claim 12, wherein a plurality of raised working areas are arranged in at least three rows, said at least three rows extending in the machine-direction of the substrate, one of said at least three rows being adjacent one side edge of the substrate, a second of said at least three rows being adjacent the opposed side edge of the substrate and a third of said at least three rows being substantially along the central longitudinal axis of the substrate, one of said raised ridges in each pair of raised ridges being disposed between said one of said at least three rows and said third of said at least three rows and the other of said raised ridges in each pair of raised ridges being disposed between said second of said at least three rows and said third of said at least three rows.

19. The cleaning card of claim 12, wherein the effective machine-direction dimension of each of said ridges is less than the circumference of an idler roll to be rotated and cleaned by said ridges, whereby more than one of said ridges is required to engage said idler roll to rotate said idler roll through one complete revolution.

20. The cleaning card of claim 12, wherein at least some of the pairs of raised ridges are separated from an adjacent pair of raised ridges in the machine direction.

21. The cleaning card of claim 20, wherein the ridges in each pair being angled relative to each other in a substantially "V" orientation.

22. The cleaning card of claim 20, wherein two pairs of adjacent raised ridges are joined to each other in a substantially diamond-shaped orientation that is located substantially medially between the opposed end edges and the opposed side edges of the substrate.

23. The cleaning card of claim 12, wherein a plurality of raised working areas are arranged in at least two rows, one of said rows extending in the machine-direction of the substrate adjacent one side edge of the substrate and the other row also extending in the machine-direction of the substrate.

24. The cleaning card of claim 23, wherein said other row is adjacent the opposed side edge of the substrate.

25. The cleaning card of claim 23, wherein said other row is disposed substantially along the central longitudinal axis of the substrate.

* * * * *